United States Patent

Martin

[15] 3,691,932
[45] Sept. 19, 1972

[54] APPARATUS FOR SUPPLYING HOT WATER FOR COFFEE BREWING PURPOSES

[72] Inventor: John C. Martin, Springfield, Ill.

[73] Assignee: Bunn-O-Matic Corporation, Springfield, Ill.

[22] Filed: July 6, 1971

[21] Appl. No.: 159,819

[52] U.S. Cl. .................................................99/281
[51] Int. Cl. ..............................................A23f 1/08
[58] Field of Search........99/280, 281, 282, 283, 300, 99/295, 304, 307

[56] References Cited

UNITED STATES PATENTS

| | | | |
|---|---|---|---|
| 3,348,468 | 10/1967 | Eisendrath | 99/282 |
| 3,366,034 | 1/1968 | Karlen | 99/295 |
| 3,450,024 | 6/1969 | Martin | 99/295 |
| 3,479,949 | 11/1969 | Reynolds | 99/295 |

Primary Examiner—Robert W. Jenkins
Attorney—Robert R. Lockwood

[57] ABSTRACT

A hot water tank has a hot water discharge pipe extending from a siphon chamber through the bottom and terminating in a discharge head. A cold water receiving basin is telescoped with the upper part of the tank, has a peripheral flange overlying the upper end of the tank, has the siphon chamber on its underside and a cold water discharge pipe opening near the bottom of the tank. A thermostatic control device, located in the path of the cold water from the cold water discharge pipe, controls the energization of an electric heating element located in the lower part of the tank. A metallic baffle overlies the electric heating element to retard the mixing of the incoming cold water with the hot water above the baffle, to act as a safety shield, and to facilitate the transfer of heat to the water in the upper part of the tank.

6 Claims, 2 Drawing Figures

PATENTED SEP 19 1972

3,691,932

APPARATUS FOR SUPPLYING HOT WATER FOR COFFEE BREWING PURPOSES

This invention relates, generally, to coffee making machines and constitutes an improvement over the constructions disclosed in U. S. Pat. No. 3,450,024 to Martin, issued June 17, 1969 and the patents and references referred to therein.

Among the objects of this invention are: To provide in a new and improved manner a siphon chamber for shutting off the flow of hot water from a tank to a hot water discharge pipe terminating in a discharge head for spraying hot water over ground coffee; to locate the siphon chamber on the underside of a cold water receiving basin telescoped with the upper part of the tank; to support the basin by a peripheral flange overlying the upper end of the tank; to discharge cold water from the basin near the bottom of the tank; to heat the water in the tank by a horizontal electric heating element controlled by a thermostatic control device located in the path of the cold water from the basin; to retard mixing of the incoming cold water with the hot water in the tank by a baffle located above the heating element; to facilitate transfer of heat to the upper part of the tank by forming the baffle of good heat conducting material; and to shield against heat from the electric heating element when the tank is partially filled through the use of the baffle.

Figure 1:
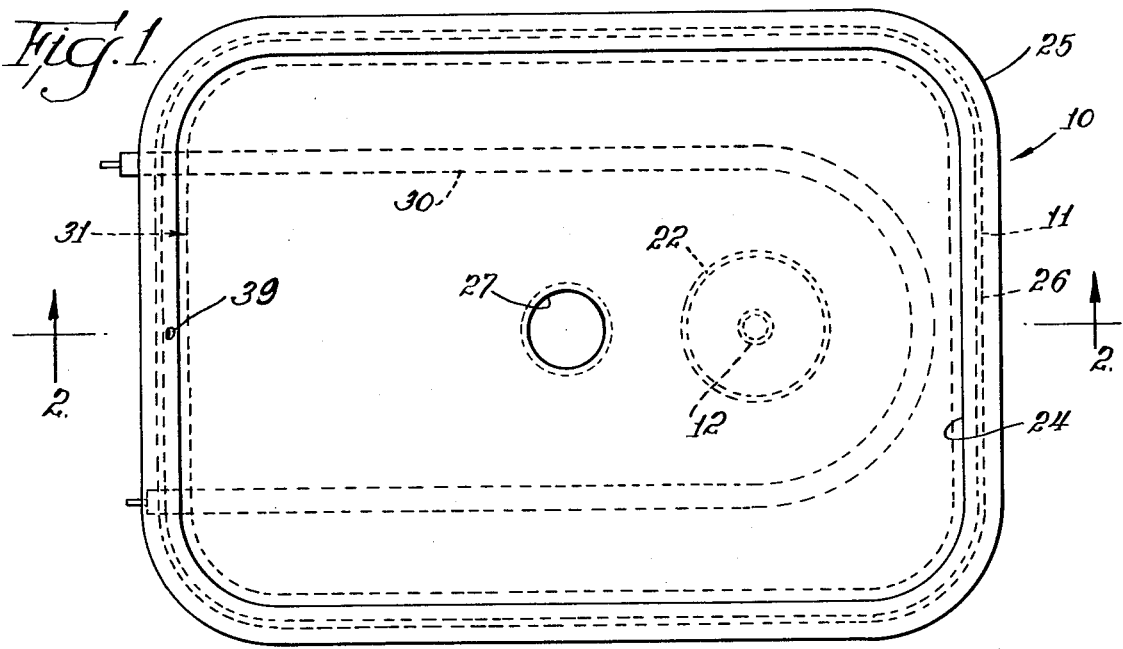
FIG. 1 is a top plan view of apparatus for supplying hot water for coffee brewing purposes constructed in accordance with this invention.

Referring to the drawing it will be observed that reference character 10 designates, generally, apparatus for supplying hot water for coffee brewing purposes. The apparatus 10 includes a tank 11 which may be formed of metal or suitable plastics material. Provision, not shown, is employed for mounting the tank 11 within a suitable housing. Preferably it is rectangular having a length of about 9 inches and a width of about 6 and ½ inches. A hot water discharge pipe 12 extends through a bottom wall 13 of the tank 11 and at its lower end it has a discharge head 14 for spraying hot water over ground coffee 15 that is placed on a filter 16 which is located in a suitable funnel 17. Conventional means is provided for supporting the funnel 17 and removing it to permit disposal of the ground coffee 15, when spent, in the filter 16. Coffee extract 18 flows downwardly from the discharge opening at the bottom of the funnel 17 as will be understood readily to be received in a suitable receptacle.

The upper end of the hot water discharge pipe 12 is located within a siphon chamber 21 that is in the form of an inverted cup 22 which may be cylindrical in configuration, formed of suitable metal, and having its bottom formed by a bottom 23 of a basin 24 which is telescoped with the upper end of the tank 11. If desired the basin 24 and the cylindrical part forming the cup 22 can be formed of plastics material. A peripheral flange 25 extends along the upper edge of the basin 24 and overlies the upper end 26 of the tank 11. Thus, it is unnecessary to provide any liquid tight joints between the tank 11 and the basin 24 since the level of water in the tank 11 is not intended to reach the upper end 26.

A cold water discharge pipe 27 extends downwardly from the bottom 23 of the basin 24 with its lower end 28 near the bottom 13 of the tank 11. A thermostatic control device 29 of known construction is located on the upper side of the bottom 13 and directly in the path of the cold water flowing downwardly from the cold water discharge pipe 27.

The thermostatic control device 29 is arranged to control the energization of a horizontal electric heating element 30 of the immersion type which is located in close proximity to the upper side of the bottom 13 of the tank 11. The electric heating element 30 is connected through the thermostatic control device 29 for energization to a suitable electric current source such as a 115 volt 60 Hz source.

It is desirable to limit the mixing of the incoming cold water from the lower end of the cold water discharge pipe 27 and the hot water in the upper portion of the tank 11. Also it is desirable to increase the rate of heat transfer between the lower and the upper portions of the water in the tank 11 and to provide a shield over the electric heating element 30 in the event that only a small portion of the water remains in the tank 11. For these purposes a horizontal baffle 31 is suitably mounted in the tank 11 over the electric heating element 30. It is preferably formed of good heat conducting material, such as copper. A space 32 is provided between the periphery of the baffle 31 and the juxtaposed inner sides of the side walls of the tank 11. This permits circulation of the water in the tank 11, but limits it for the purposes above described.

Figure 2:
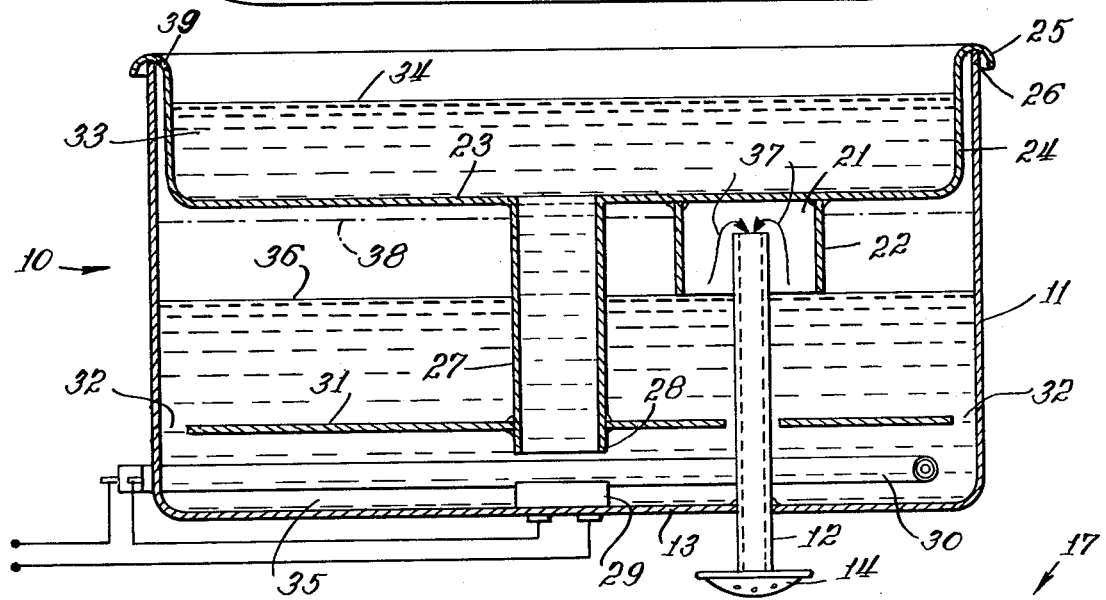
FIG. 2 is a vertical sectional view taken generally along line 2—2 of FIG. 1.
Figure 2:
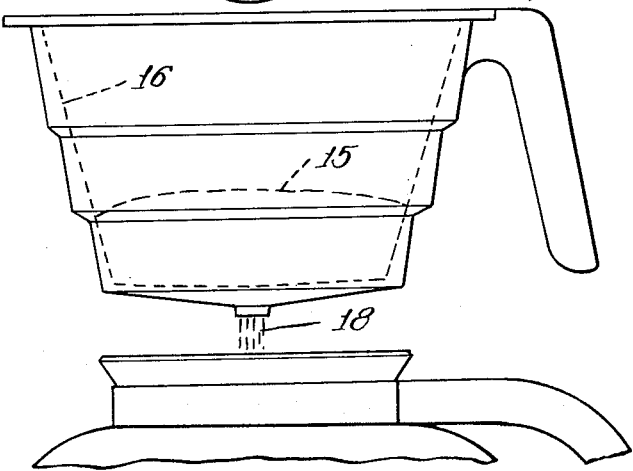

The basin 24 is provided for receiving cold water, indicated at 33, to the level indicated at 34. The quantity of cold water 33 corresponds to the quantity of coffee extract 18 that it is desired to brew. A greater or a lesser amount of cold water 33 is poured into the basin 24 as may be required. The maximum water level is indicated at 34. The cold water poured into the basin 24 flows downwardly through the cold water discharge pipe 27 and mixes with hot water 35 in the tank 11 which is continuously maintained at a predetermined elevated temperature under the control of the thermostatic control device 29 by the horizontal electric heating element 30. The maximum level of the hot water 35 in the tank 11 is indicated at 36. No hot water flows through the hot water discharge pipe 12 until the water level 36 is about as illustrated in FIG. 2. The hot water then flows into the upper end of the hot water discharge pipe 12 as indicated by arrows 37. The hot water continues to flow over the ground coffee 15 in the funnel 17 until the level of the hot water in the tank 11 flows to that indicated at 38 which is the elevation of the lower end of the siphon chamber 21. As soon as this level is reached, no further hot water flows through the hot water discharge pipe 12 and no further hot water is discharged from the discharge head 14. A vent opening 36 is provided in the peripheral flange 25 and the vertical wall of the basin 24 is spaced from the juxtaposed inner surface of the upper end of 26 the tank 11 in order to insure that atmospheric pressure is applied to the water 35 in the tank 11.

I claim:

1. Apparatus for supplying a predetermined quantity of hot water for brewing coffee extract comprising a tank having an open top, a horizontal electric heating element in said tank, a hot water discharge pipe extending through the bottom of said tank, a discharge head at the lower end of said discharge pipe, a basin across the upper end of said tank for receiving a predetermined quantity of cold water, a cold water discharge pipe depending from the bottom of said basin and opening into the lower part of said tank, and means providing a siphon chamber at the upper end of said hot water discharge pipe.

2. Apparatus according to claim 1 wherein said siphon chamber comprises an inverted cup the bottom of which is formed by the bottom of said basin.

3. Apparatus according to claim 1 wherein a thermostatic control device is connected to control the energization of said electric heating element and is located in said tank in the path of cold water flowing from said cold water discharge pipe.

4. Apparatus according to claim 1 wherein said electric heating element is located near the bottom of said tank, and a baffle is located above said electric heating element to retard mixing of the incoming cold water below the baffle with the hot water above said baffle and to act as a safety shield against heat from said electric heating element in a partially filled tank.

5. Apparatus according to claim 4 wherein said baffle is formed of good heat conducting material to facilitate transfer of heat from said electric heating element to the water in the upper portion of said tank.

6. Apparatus according to claim 1 wherein said basin is telescoped with said upper part of said tank and has a peripheral flange overlying the upper end of said tank.

* * * * *